(12) United States Patent
Santa Cruz et al.

(10) Patent No.: US 6,748,697 B1
(45) Date of Patent: Jun. 15, 2004

(54) PLANT OVER-WATERING PROTECTIVE DRAINAGE ARTICLE

(76) Inventors: Cathy D. Santa Cruz, 7630 Tholl Dr., Reno, NV (US) 89506; Edward A Carwin, 1330 Jones St., Reno, NV (US) 89703

( * ) Notice: Subject to any disclaimer, the term of this patent is extended or adjusted under 35 U.S.C. 154(b) by 0 days.

(21) Appl. No.: 10/316,648

(22) Filed: Dec. 11, 2002

(51) Int. Cl.$^7$ ................................................. A01G 9/02
(52) U.S. Cl. ............................................................. 47/71
(58) Field of Search ........................ 47/66.6, 75, 41.11, 47/81, 71, 58.01

(56) References Cited

U.S. PATENT DOCUMENTS 4,138,803 A * 2/1979 Sherlock ........................ 47/67
5,454,191 A * 10/1995 Mayeda et al. ............... 47/65.8
6,543,183 B1 * 4/2003 McNaughton ............. 47/41.01

FOREIGN PATENT DOCUMENTS

FR          2664467 A1 * 1/1992  ............ A01G/9/04

* cited by examiner

*Primary Examiner*—Michael J. Carone
*Assistant Examiner*—Bethany L. Griles

(57) ABSTRACT

The invention provides a novel and unique drainage article that is removably attachable onto an object that inadvertently drips water there from, such as for use when watering a hanging plant or the like. The article may simply comprise one sheet of non-pervious water resistant material with attachment hooks or the like thereon, or the article may incorporate an additional sheet of material used in combination. Also different optional features may be included, such as indicia for measuring drainage water, drainage options, a sponge, informational pocket, etc.

4 Claims, 2 Drawing Sheets

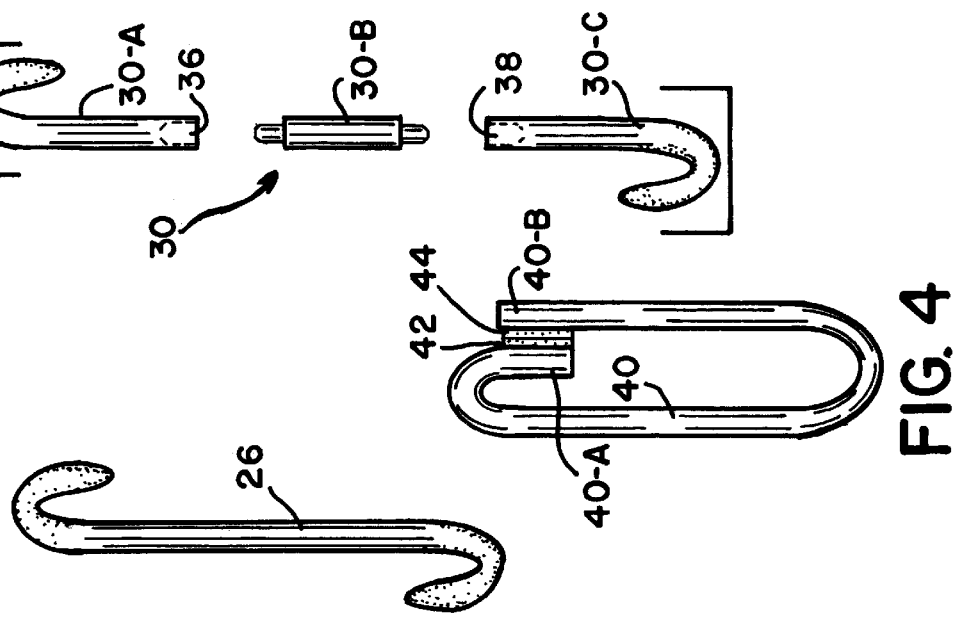
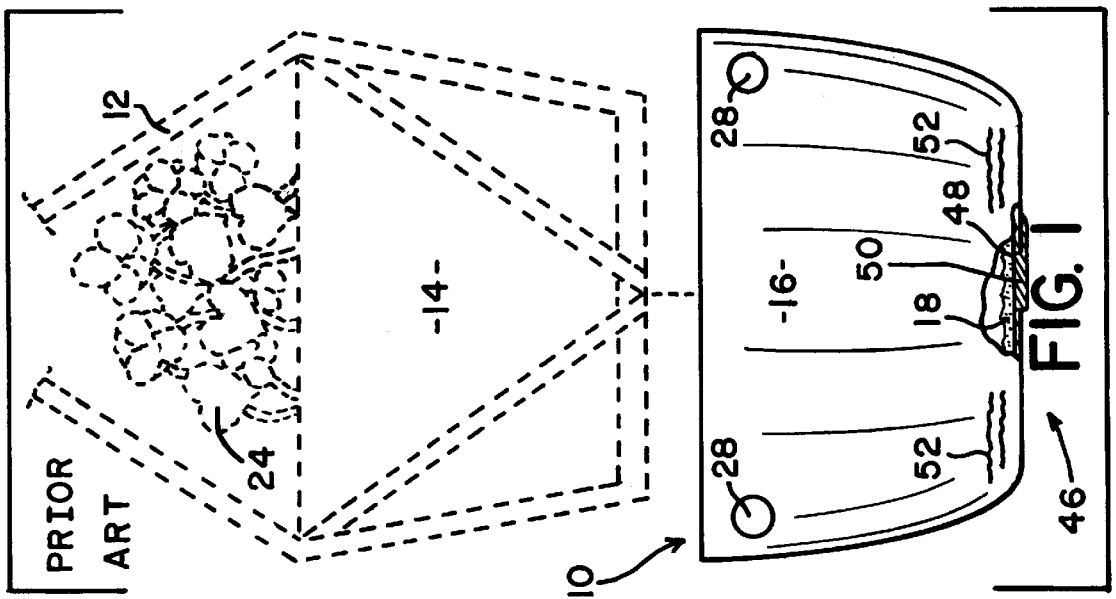

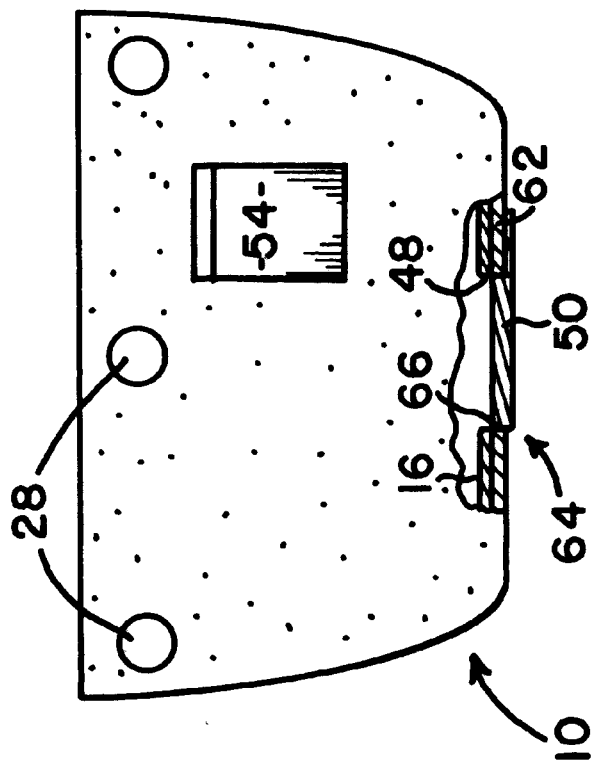
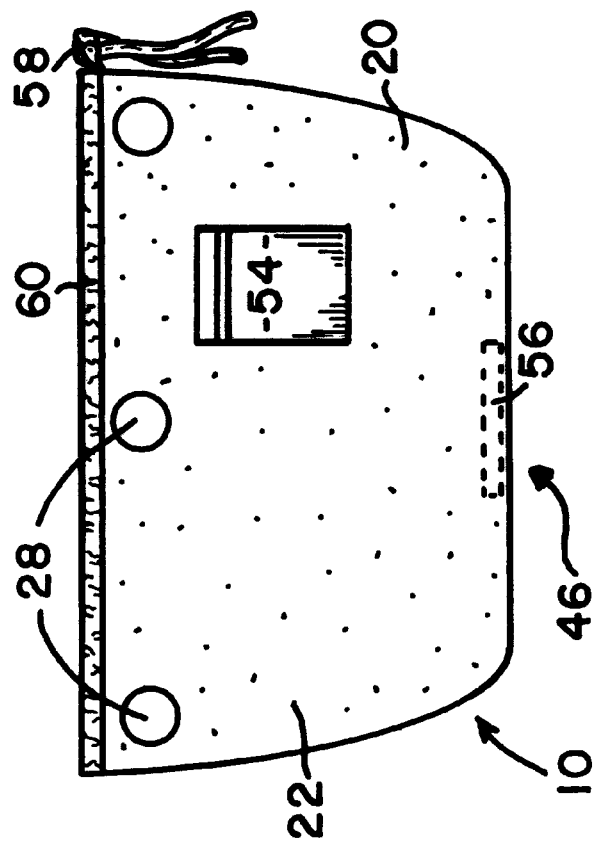

PLANT OVER-WATERING PROTECTIVE DRAINAGE ARTICLE

FIELD OF THE INVENTION

This invention relates in general to pads or absorbent articles that can be used for capturing drainage water from a potted plant when over-watering has accidentally occurred. However, the invention more particularly pertains to an article that can be easily positioned and removably attached onto either the potted plant itself, the plant container, or the hanging potted plant holder. The article is of simple cost effective construction and it can be reusable, disposable, and/or a combination thereof Also, various novel features and different embodiments are taught herein which allow for versatility and individual user preferences.

BACKGROUND OF THE INVENTION

Potted plants are commonly used for either indoor or outdoor aesthetic and/or air quality purposes. It is further common to hang potted plants outdoors during summertime and place them indoors during the wintertime, thus removable potted plant hangers are most convenient and are typically used for this purpose.

Unfortunately most potted plants must be aerated, whereby it is important that the plant container provide aeration and water discharge holes which are typically located on the underside of the plant container. Thus when over-watering has occurred, excess water inadvertently drains downward into the plant roots and outwardly from within the container throughout the aeration/drainage holes. This tends to be quite a nuisance as this excess water must be quickly absorbed and/or captured in some manner so as to eliminate possible water damage to any underlying surface or object, such as household flooring, carpeting, furniture, or the like.

As a result, may attempts to relieve this problem have been proposed but each have inherent drawbacks and disadvantages which have heretofore not been recognized, addressed, or resolved in an efficient manner. For example, many plant containers have incorporated use of a drip tray that is either removable or it can be integrally formed with the container itself. Such drip trays are somewhat functional as they can capture a small amount of drainage water but the amount is limited. Also, such drip trays are usually made from a non-absorbent material and thus the drainage water can easily overflow there from, or even worse the drainage water becomes stagnant, dirty and smelly, which in turn may damage or even kill the plant due to contaminated drainage water being reabsorbed by the plant. Therefore, it can clearly be seen that drip trays are not the answer and in fact may cause more problems than they resolve.

Other attempts to resolve the noted problem include use of receptacles such as buckets, cans, pans, or the like. These types of receptacles are somewhat functional as they can capture a larger amount of drainage water. However, they are definitely not aesthetically pleasing. The receptacle must be perfectly positioned either on the ground surface beneath the plant container, or manually held directly underneath the plant container itself while draining. Also such receptacles while in use may be dangerous, as they then become an obstacle and if not noticed this can easily cause an accident.

Still other attempts to resolve the noted problem include use of an absorbent towel or pad, which is again typically positioned on either the ground surface beneath the plant container or manually held in place against the plant container while draining. This again results in possible water damage to the underlying structure or flooring, is very messy and does not resolve the problem in an appropriate manner.

It is therefore obvious that a need exists for an acceptable solution to the noted problem that has not heretofore been addressed or resolved within the known prior art. Thus, the present invention is novel and unique as it recognizes, addresses, and resolves inherent disadvantages associated with the known existing prior art.

OBJECTS AND ADVANTAGES OF THE PRESENT INVENTION

It is therefore an object of the present invention to provide a plant over-watering protective drainage article that is of simple construction and which may be easily manufactured and marketed in a cost effective manner.

It is another object of the present invention to provide a plant over-watering protective drainage article that may be made from substantially any suitable material of engineering choice, such as plastic, a cloth which has been chemically treated with a water repellent, an absorbent material and/or a combination of each.

Yet another object of the present invention is to provide a plant over-watering protective drainage article that includes various attachment means of engineering choice for removably adjustably attaching the article onto either the branches of potted plant itself, the actual plant container, or the hanging plant hanger. Also the noted attachment means may be of any suitable type depending on engineering and/or user choice, such as hooks, eyelets, hook and loop fasteners, etc., this also depends on the preferred embodiment of choice.

Still another object of the present invention is to provide a plant over-watering protective drainage article that may further include additional optional accessories if so desired. For example, the article may include a centralized drainage means that allows a user to easily drain any water from the article in a simplified, efficient manner. The article may further include measuring means such as indicia thereon that allows a user to visually determine how much water the plant absorbed and how much water was not needed. Also, if desired the article may include an accessory compartment for containment of pertinent information regarding the plant, such as the type of plant, when the plant was planted, watering instructions, or the like. Other items may also be included depending on user choice, such as individual fertilizer packets, plant spray, air-deodorizer, etc.

Another object of the present invention is to provide a plant over-watering protective drainage article that may be manufactured and sold as a disposable item, or as a reusable item, and/or a combination of each. Also, the article may be manufactured in various sizes, or it may be formed so as to be a one-size-fits-all, or the like.

Yet another object of the present invention is to provide a plant over-watering protective drainage article which may further include decorations thereon so as to be aesthetically pleasing, or the decorations may be interchangeable so as to correspond with different holidays or the like, or still further it may be camouflaged so as to blend in with the plant itself.

Other objects and advantages will be seen within the following specification and drawings.

BRIEF DESCRIPTION OF THE DRAWINGS

FIG. 1 is substantially a plan overview of a first embodiment for the present invention.

FIG. 2 is substantially an enlarged side view of a first optional fastener means.

FIG. 3 is substantially an enlarged side view of a second optional fastener means.

FIG. 4 is substantially an enlarged side view of a third optional fastener means.

FIG. 5 is substantially an overview of a second embodiment for the present invention.

FIG. 6 is substantially an overview of a third embodiment for the present invention.

DETAILED DESCRIPTION OF THE DRAWINGS

Referring now in detail to the drawings wherein like characters refer to like elements throughout the various views. As depicted in FIG. 1, (10) represents an overview of a first embodiment for the plant over-watering protective drainage article of the present invention. It is to be understood that the present invention is suitable for use with any type of pre-existing plant hanger and/or plant container of user choice. Thus the plant hanger (12) and the plant container (14) 1as depicted herein are each only exemplary of one possible type and the invention is therefore not to be limited to use with any specific type of plant hanger or container.

The first embodiment for our plant over-watering protective drainage article (10) as depicted in FIG. 1, is of very simple construction and is substantially comprised of a flexible sheet of non-pervious water resistant material (16) and includes attachment means (later described) thereon for removably attaching the flexible sheet of non-pervious water resistant material (16) onto an object of user choice. Whereby, it can clearly be seen when the flexible sheet of non-pervious water resistant material (16) is removably attached onto the noted object, the flexible sheet of non-pervious water resistant material (16) naturally assumes a form that functions as a receptacle respectively, for capturing and retaining drainage water (18) therein.

It is to be understood that the flexible sheet of non-pervious water resistant material (16) may be constructed so as to be either disposable or reusable, depending on engineering choice. For example, the plant over-watering protective drainage article (10) may be made from thin plastic similar to a disposable garbage or sandwich bag. Or if preferred the flexible sheet of non-pervious water resistant material (16) may be made from a thicker type of plastic material so as to, be more durable and reusable. Yet another option is to make the flexible sheet of non-pervious water resistant material (16) from some type of cloth (20) as depicted in FIG. 5, and the cloth (20) being chemically treated with a water repellent (22), or the like. If the latter is the case, this is very advantageous as this allows the user to easily toss the article into the washing machine for cleansing. Thereafter, the user may reapply the water repellent thereon and the water repellent may be sold along with the item as an option.

It is to be further noted the previously stated object may be any object of user choice that necessitates the need for a receptacle that can be used for capturing and retaining drainage water therein. For example, as taught herein the object of choice may be one of the following such as a plant (24), a plant container (14), a plant hanger (12), or even a combination thereof.

Referring now to FIGS. 2–4 wherein we depict the previously noted attachment means for removably attaching the flexible sheet of non-pervious water resistant material (16) onto an object. Again it is to be understood that any suitable type of fasteners may be used according to engineering choice, thus the fasteners as depicted herein are only exemplary and the invention is not to be limited thereto. In FIG. 2, we depict a first fastener means comprising of an integrally formed elongated member (26) which is shaped to form two opposing hooks and flexible sheet of non-pervious water resistant material (16) having multiple holes or eyelets (28, see FIG. 1) which are of a shape and size to receive one of the opposing hooks therein. It is to be noted for clarity purposes only two holes or eyelets (28) are shown but it is to be understood there are multiples thereof so as to allow the article (10) to hang in a uniform manner. As can clearly be seen one of the hooks can be easily removably attached to the noted object while the other opposing hook can be easily removably inserted and attached into one of the holes or eyelets (28). However, if the flexible sheet of non-pervious water resistant material (16) does not have holes or eyelets (28) one of the hook members may function as a tool for puncturing a hole therein and then attached at the desired location and this also functions quite well. The latter may be more functional for use with the article (10) if it is to be used for one-time-use and discarded thereafter. Furthermore, integrally formed elongated member (26) may be made from any suitable material of choice, such as aluminum, steel plastic, hard rubber, wood, or the like.

Referring now to FIG. 3, which substantially depicts a second type of suitable fastener means for removably attaching the flexible sheet of non-pervious water resistant material (16) onto an object. Wherein, we provide an adjustable hook member (30) comprising of a top section (30-A) that is shaped to form a first hook, at least one central connecting section (30-B) and a bottom section (30-C) that is shaped to form a second hook. As can be seen in FIG. 3, central connecting section includes a first protruding leg member (32) and a second protruding leg member (34). Top section (30-A) includes an internal opening (36) which is of a shape and size to frictionally receive and retain first protruding leg member (32) therein. Bottom section (30-C) includes an internal opening (38) which is of a shape and size to frictionally receive and retain second protruding leg member (34) therein Whereby it can be seen that each section (30-A, 30-B & 30-C) may be easily removably interconnected to form the adjustable hook member (30). It is to be noted that if so desired, multiples of central section (30-B) may be provided so as to allow the user to adjustably extend or shorten the overall length of adjustable hook member (30) to their liking. It is to be further noted this type of fastener is very functional and provides unusual results, as due to its design it allows the user to easily rotate each hook (30-A & 30-C) 360° into a position of user choice which is most advantageous. If however it is determined that a more secure attachment means for interconnecting sections (30-A, B & C) is needed, additional fastening means may be incorporated. For example, a couple of typical cotter-pins (not shown) may be incorporated and inserted into a hole provided in each hook member (30-A & 30-C). However, being such fasteners are well known, a cotter-pin is not herein shown for clarity purposes, but it is to be inherent.

Referring now to FIG. 4, which substantially depicts a third type of suitable fastener means for removably attaching the flexible sheet of non-pervious water resistant material (16) onto an object. Wherein, we provide an adjustable strap member (40) having a first end (40-A) that includes a loop type fastener (42) thereon, and a second end (40-B) that includes a pile type fastener (44) thereon. Whereby, adjustable strap member (40) can be threadably inserted into one of the holes or eyelets (28) then wrapped around the object and secured in place by loop and pile fasteners (42 & 44).

It is to be understood the first embodiment as previously described is fully functional in itself, as it allows the user to easily attach the article (10) onto the object and then capture dripping water therein. Thereafter, the user can simply remove the article with the water therein, twist it so as to eliminate accidental spillage, and then dispose of the article (10) in the normal manner. Or if the user prefers to reuse the article (10), they may simply empty the contents there from such as into a sink, reattach the article, or store it for future use.

As previously noted, the present invention may include additional novel features or variable embodiments if so desired. For example as depicted in FIG. 1, flexible sheet of non-pervious water resistant material includes a central section (46) having drainage means therein for draining the water (18) there from. Again, any suitable type of drainage means may be incorporated depending on engineering choice, such as turn valves, drain holes and removable plugs, etc. However, the preferred drainage means is shown in FIG. 1 wherein central section (46) of flexible sheet of non-pervious water resistant material (16) includes a drainage hole (48) and closure means in the form of a fixedly attached plastic plug (50), which proves to be most functional, convenient and cost effective. It is to be noted this type of drainage means is commonly found and used in inflatable rafts, or the like.

Yet another novel feature may be to include indicia (52) imprinted upon the exterior surface of the central section (46) respectively, which is in the form of measurements for calculating the amount of drainage water (18) that was not used by the plant (24). For example, the measurements may be indicative of ounces, millimeters, etc. This is most functional especially if the flexible sheet of non-pervious water resistant material (16) is transparent plastic.

Still another novel feature may be to include upon the exterior surface of flexible sheet of non-pervious water resistant material, (16) a pocket (54) thereon as illustrated in FIG. 5. This is very useful for containment of information or accessories pertinent to the plant. For example, one may wish to retain the informational tag that is typically attached onto the plant at the point of sale, and includes the name thereof, watering instructions, preferred temperature, etc. Yet other items or accessories may be stored within pocket (54), such as fertilizer packets, air freshener packets which may be used to enhance the natural aroma of the plant, such as Gardenia, rose, pine, lavender, or the like.

Another novel feature may be to include use of an absorbent material such as a sponge (56) as depicted in FIG. 5. This is functional for several reasons, one being that this allows a user to simply position the sponge within the noted central section (46) while watering. Thereafter, when the water is finished dripping the user simply grasps the water soaked sponge (56) and then squeezes the contents there from, such as over a sink or the like. Thus, the user need not remove the article (10) and it may remain in place at all times if so desired. Yet another advantage of the sponge (56) is that again if the user desires to know the amount of drainage water (18) that drained from the plant (24), they may simply empty the contents from the water soaked sponge (56) into a typical measuring cup.

Yet another option may be to produce the article (10) in various sizes, such as extra large, large, medium, small and extra small. However, as another novel option the article (10) may include size adjustment means depending on engineering choice, such as the article (10) may be pleated so as to allow for expansion. Or as depicted in FIG. 5, article (10) may include a size adjustment means in the form of an elastic pull string (58) which is retained within a sleeve (60) and this allows the article (10) to be easily adjusted to the size of user choice.

Still another optional feature may be to include an additional sheet of flexible material (62) (see FIG. 6) that is of a shape and size to substantially mate with flexible sheet of non-pervious water resistant material (16). It is to be noted additional sheet of flexible material (62) and flexible sheet of non-pervious water resistant material (16) may be either fixedly attached together such as by stitching or glue, (not shown) or the like. Or if preferred additional sheet of flexible material (62) and flexible sheet of non-pervious water resistant material (16) may be removably attached together such as by snaps, buttons, a zipper, Velcro, (not shown) etc.

The novel feature of including the additional sheet of flexible material (62) in combination with flexible sheet of non-pervious water resistant material (16) allows a user to easily remove article (10) and empty the drainage water (18) there from. Also, and most important the additional sheet of flexible material (62) may be used for decorative or camouflage purposes. It is well known that most people are very enthusiastic about holidays and such so it would be most advantageous to allow a user to decorate their plants accordingly. Such as a user may wish to interchange the additional sheet of flexible material (62) for various holidays. For example, for Christmas a user may attach an additional sheet of flexible material (62) that has been pre-decorated with Christmas related items thereon, including little Santa Clauses, elves, presents, etc. Furthermore, if so desired each of the attachment means such as hooks (26 or 30) may be decorated as well, such as to appear as candy canes or the like. If this is the case, the article (10) may be sold as a complete Holiday kit having multiple interchangeable items for different occasions.

Still further, as noted above the user may simply wish to camouflage article (10) so as to blend in with plant (24) and this allows the user to leave the article in place at all times, until draining is necessary. In this case, article (10) may be sold as a kit having various additional sheets of flexible material (62) each of which provide a different camouflaged design thereon so as to be useable with different types of plants. It is to be understood that additional sheet of flexible material (62) may simply be in the form of a removable skirt, respectively, and thus additional sheet of flexible material (62) may simply be used for decoration purposes only and there would be no need for drainage means therein.

If the above embodiment is the preferred choice, then flexible sheet of non-pervious water resistant material (16) and additional sheet of flexible material (62) each may further include a central section (46 & 64) which are in alignment with each other respectively, and each central section (46 & 64) having appropriate drainage means therein for draining drainage water (18) there from. For example, the drainage means may include each central section (46 & 64) having a drainage hole (48 & 66) which are aligned in open communication with each other and a closure means such as in the form of a plug (50), or the like. It is again to be understood if this embodiment is the desired choice, then additional sheet of flexible material (62) may also include additional optional features such as indicia (52), a pocket (54), adjustment means (58) and each may be incorporated independently or in combination.

It can now be seen we have herein provided a novel and unique plant over-watering protective drainage article that is of very simple construction, it includes many optional features, and is most functional for its, intended use and purpose.

Although the invention has been herein shown and described in what is conceived to be the most practical and preferred embodiment, it is recognized that departures may be made there from within the scope and spirit of the invention, which is not to be limited to the details disclosed herein but is to be accorded the full scope of the claims so as to embrace any and all equivalent devices and apparatuses.

Having described our invention, what we claim as new and desire to secure by Letters Patent is:

1. A plant over-watering protective drainage article comprising: a flexible sheet of non-pervious water resistant material having attachment means for removably attaching said flexible sheet of non-pervious water resistant material onto an object, and said object being either the branches of a plant, a plant container, a plant hanger, or a combination thereof, whereby:
when said flexible sheet of non-pervious water resistant material is removably attached onto said object, said flexible sheet of non-pervious water resistant material functions as a receptacle for capturing and retaining drainage water therein.

2. A plant over-watering protective drainage article comprising: a flexible sheet of non-pervious water resistant material having attachment means for removably attaching said flexible sheet of non-pervious water resistant material onto an object, said object being either the branches of a plant, a plant container, a plant hanger, or a combination thereof, said article includes a removable sponge, said flexible sheet of non-pervious water resistant material includes a central section having drainage means therein for draining said drainage water there from, said drainage means includes said central section having a drainage hole with closure means in the form of a plug, said central section having indicia thereon which is in the form of measurements for calculating the amount of said drainage water, and said flexible sheet of non-pervious water resistant material includes an exterior surface having a pocket thereon, whereby:
when said flexible sheet of non-pervious water resistant material is removably attached onto said object, said flexible sheet of non-pervious water resistant material functions as a receptacle for capturing, retaining, measuring and draining said drainage water.

3. the article of claim 2 wherein said pocket is used for containment of information and/or accessories pertinent to said object, said pertinent information including at least one or a combination of the following: watering instructions; preferred temperature; name; and said accessories including fertilizer packets, and/or air freshener packets.

4. A plant over-watering protective drainage article comprising: a flexible sheet of non-pervious water resistant material having attachment means for removably attaching said flexible sheet of non-pervious water resistant material onto an object, said article having an additional sheet of flexible material which is of a shape and size to mate with said flexible sheet of non-pervious water resistant material, said additional sheet of flexible material and said flexible sheet of non-pervious water resistant material are either fixedly attached or removably attached together, said flexible sheet on non-pervious water resistant material and said additional sheet of flexible material each include a central section which are in alignment with each other, said central section having drainage means therein for draining said drainage water there from, said drainage means includes each said central section having a drainage hole which are aligned and in open communication with each other and a closure means in the form of a plug, said additional sheet of flexible material includes indicia thereon which is in the form of measurements for calculating the amount of said drainage water, and said additional sheet of flexible material includes an exterior surface having a pocket thereon, whereby:
when said flexible sheet of non-pervious water resistant material is removably attached onto said object, said flexible sheet of non-pervious water resistant material functions as a receptacle for capturing and retaining drainage water therein.

* * * * *